US011794700B2

(12) United States Patent
Shinde et al.

(10) Patent No.: US 11,794,700 B2
(45) Date of Patent: Oct. 24, 2023

(54) WIPER SYSTEM FOR A VEHICLE WINDSHIELD

(71) Applicant: Volvo Truck Corporation, Gothenburg (SE)

(72) Inventors: Antriksh Shinde, Ambejogai (IN); Madhuchandra K S, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 163 days.

(21) Appl. No.: 17/439,051

(22) PCT Filed: Jan. 28, 2020

(86) PCT No.: PCT/EP2020/051967
§ 371 (c)(1),
(2) Date: Sep. 14, 2021

(87) PCT Pub. No.: WO2020/187471
PCT Pub. Date: Sep. 24, 2020

(65) Prior Publication Data
US 2022/0153233 A1    May 19, 2022

(30) Foreign Application Priority Data
Mar. 19, 2019 (IN) .............................. 201941010716

(51) Int. Cl.
*B60S 1/44* (2006.01)
*B60S 1/34* (2006.01)
*B60S 1/38* (2006.01)

(52) U.S. Cl.
CPC .............. *B60S 1/44* (2013.01); *B60S 1/3406* (2013.01); *B60S 1/3463* (2013.01); *B60S 2001/3812* (2013.01)

(58) Field of Classification Search
CPC ............ B60S 2001/3837; B60S 1/3806; B60S 1/3404; B60S 1/0491; B60S 1/3463; B60S 2001/3812; B60S 1/3406; B60S 1/44

(Continued)

(56) References Cited

U.S. PATENT DOCUMENTS

| 1,515,584 A | 11/1924 | Hansen |
| 3,089,175 A | 5/1963 | Hinder |

(Continued)

FOREIGN PATENT DOCUMENTS

| CN | 104670167 A | 6/2015 |
| DE | 4139457 A1 | 6/1993 |

(Continued)

OTHER PUBLICATIONS

International Search Report and Written Opinion for International Patent Application No. PCT/EP2020/051967, dated Apr. 17, 2020, 13 pages.

(Continued)

*Primary Examiner* — Katina N. Henson
(74) *Attorney, Agent, or Firm* — Withrow & Terranova, PLLC

(57) ABSTRACT

The present disclosure relates to a wiper system (100) for a vehicle windshield (102), the wiper system comprising a first wiper arm (104) and a second wiper arm (106), the first and second wiper arms being movable in at least a vertical direction (200); and a horizontal wiper arrangement (300) comprising a wiper blade (302) arranged to wipe the surface of the vehicle windshield, the horizontal wiper arrangement (300) further comprising a horizontally extending wiper guide element (304) connected to the wiper blade for arranging the wiper blade to extend between vertical end sides (502, 504) of the vehicle windshield, the first (104) and second (106) wiper arms being connected to the horizontally extending wiper guide element (304) for vertically moving the horizontal wiper arrangement (300) between a vertically lower position (602) of the vehicle windshield and a vertically higher position (604) of the vehicle windshield; wherein the wiper system (100) further comprises a plurality of spring elements (700) connecting the wiper blade (302) to the horizontally extending wiper guide element (304), the plurality of spring elements being spaced apart from each other along the length of the horizontally extending wiper guide element (304), wherein the spring elements (700) are arranged to force the wiper blade (302) towards the windshield in a horizontal direction (202) perpendicular to the direction of the horizontally extending wiper guide element.

12 Claims, 5 Drawing Sheets

(58) Field of Classification Search
USPC .................................................... 15/250.23
See application file for complete search history.

(56) References Cited

U.S. PATENT DOCUMENTS

| | | |
|---|---|---|
| 4,592,110 A | 6/1986 | Verton |
| 9,387,826 B2 * | 7/2016 | Lieven ................. B60S 1/3875 |

FOREIGN PATENT DOCUMENTS

| | | |
|---|---|---|
| DE | 4333137 C2 | 3/1995 |
| FR | 2994915 A1 | 3/2014 |
| KR | 20020055979 A | 7/2002 |
| WO | 9801329 A1 | 1/1998 |

OTHER PUBLICATIONS

Examination Report for Indian Patent Application No. 201941010716, dated Oct. 19, 2022, 6 pages.

* cited by examiner

WIPER SYSTEM FOR A VEHICLE WINDSHIELD

This application is a 35 USC 371 national phase filing of International Application No. PCT/EP2020/051967, filed Jan. 28, 2020, which claims the benefit of Indian Patent Application No. 201941010716, filed Mar. 19, 2019, the disclosures of which are incorporated herein by reference in their entireties.

TECHNICAL FIELD

The present disclosure relates to a wiper system for a vehicle windshield. The disclosure also relates to vehicle comprising such a wiper system. The wiper system of the present disclosure is thus applicable on vehicles, in particularly low, medium and heavy duty vehicles commonly referred to as trucks. Although the invention will mainly be described in relation to a truck, it may also be applicable for other type of vehicles, such as e.g. on a rear window of a car, etc.

BACKGROUND

Conventional wiper systems for vehicles are often arranged as two pendulum wipers connected to the vehicle chassis at a position below the vehicle windshield. Hereby, the two pendulum wipers rotate at the lower portion of the windshield when wiping the windshield. The two pendulum wipers may be arranged to move in the same direction or in opposite direction to each other.

However, using two pendulum wipers may not wipe the windshield sufficiently as a relatively large area above the extension of the wipers will not be wiped. This is in particular evident for larger windshields. For such larger windshields, a solution is to use an additional pendulum wiper. Hence, three pendulum wipers are used. Such solution is however still faced with the problem of leaving an un-wiped area at the upper end of the windshield and in particular at the upper corner areas of the windshield.

A further solution is to use a horizontal wiper which is arranged to move vertically from a lower position of the windshield to an upper position thereof. A document describing such a wiper is DE 41 39 457. However, the solution presented in DE 41 39 457 is still faced with the problem of sufficiently wiping a windshield which is to some extent curved in the vertical direction.

There is thus a desire to improve the wiping capabilities of a horizontal wiper system.

SUMMARY

It is an object of the present disclosure to describe a wiper system which at least partially overcomes the above described deficiencies. This is achieved by a wiper system according to claim 1.

According to a first aspect, there is provided a wiper system for a vehicle windshield, the wiper system comprising a first wiper arm and a second wiper arm, the first and second wiper arms being movable in at least a vertical direction; and a horizontal wiper arrangement comprising a wiper blade arranged to wipe the surface of the vehicle windshield, the horizontal wiper arrangement further comprising a horizontally extending wiper guide element connected to the wiper blade for arranging the wiper blade to extend between vertical end sides of the vehicle windshield, the first and second wiper arms being connected to the horizontally extending wiper guide element for vertically moving the horizontal wiper arrangement between a vertically lower position of the vehicle windshield and a vertically higher position of the vehicle windshield; wherein the wiper system further comprises a plurality of spring elements connecting the wiper blade to the horizontally extending wiper guide element, the plurality of spring elements being spaced apart from each other along the length of the horizontally extending wiper guide element, wherein the spring elements are arranged to force the wiper blade towards the windshield in a horizontal direction perpendicular to the direction of the horizontally extending wiper guide element.

The wording "at least a vertical direction" should be construed such that the first and second wiper arms can move the horizontal wiper arrangement in the vertical direction. This can be accomplished by e.g. using a rotatable wiper which is rotatably connected to the vehicle body. The vertical motion can also be achieved using a telescopic arrangement connected to the first and second wiper arms. Other alternatives are also conceivable. Moreover, the first and second wiper arms can be connected at a position below the vehicle windshield, or at a position above the vehicle windshield.

Furthermore, the vertical end sides of the vehicle windshield must not necessarily be the most outer end portions of the windshield. In a similar manner, the vertically lower position and vertically higher position must not necessarily be the lowest position and the highest position of the windshield. Hence, the horizontal wiper arrangement can be arranged to wipe almost the entire surface of the windshield.

The inventors of the present disclosure have realized that the use of a horizontal wiper arrangement is advantageous as a larger area of the vehicle windshield can be wiped when e.g. driving the vehicle in rainy conditions. Also, a horizontal wiper arrangement can be formed to follow a curved design of the vehicle windshield, thus improving the overall wiping characteristics. Furthermore, by providing a plurality of spring elements between the wiper blade and the horizontally extending wiper guide element, a uniformly distributed force towards the windshield can be obtained. In other words, the wiper blade is uniformly pushed towards the windshield which will improve the overall wiping of water from the windshield.

According to an example embodiment, the plurality of spring elements may be uniformly spaced apart from each other.

Hereby, an even further improved force distribution between the wiper blade and the vehicle windshield can be obtained. The plurality of spring elements may also be divided into two or more sets of spring elements, where the spring elements of each set of spring elements are uniformly spaced apart from each other.

According to an example embodiment, each of the first and second wiper arms may be pivotably connected to the horizontally extending wiper guide element for rotation around a geometric rotation axis configured to be substantially perpendicular to a plane defined by the surface of the windshield.

According to an example embodiment, each of the first and second wiper arms may comprise a pivotable portion at an opposite end compared to the connection of the horizontally extending wiper guide element, wherein the first and second wiper arms are rotatably connectable to a portion of the vehicle chassis.

Hereby, the first and second wiper arms operate in a similar manner as conventional rotatable wiper blades. An advantage is that the horizontal wiper arrangement can be connected to the "old" wiping system, preferably to a system using wiper arms moving in opposite directions.

According to an example embodiment, each of the first and second wiper arms may comprise a retractable portion for extending and retracting the first and second wiper arms when vertically moving the horizontal wiper arrangement between the vertically lower and upper positions of the vehicle windshield.

The retractable portion may preferably be a telescopic arrangement which is arranged to retract when the horizontal wiper arrangement moves away from the connecting portion to the vehicle chassis. An advantage is, for example, that the first and second wiper arms can be made smaller in size.

According to an example embodiment, the wiper system may further comprise a horizontal sliding portion, wherein one of the end portions of each of the first and second wiper arms is slidably connected to the horizontal sliding portion for being horizontally movable when vertically moving the horizontal wiper arrangement between the vertically lower and upper positions of the vehicle windshield.

According to an example embodiment, the wiper system may further comprise an electric motor connected to each of the first and second wiper arms for controlling the vertical motion of the horizontal wiper arrangement.

The electric motor is preferably used for operating the first and second wiper arms to move horizontally along the horizontal sliding portion.

According to an example embodiment, the first and second wiper arms may comprise a respective wiper blade arranged to slide against the surface of the vehicle windshield when vertically moving the horizontal wiper arrangement between the vertically lower and upper positions of the vehicle windshield.

Hereby, also the first and second wiper arms contribute to the wiping of the vehicle windshield, thus improving the overall wiping of e.g. rain.

According to an example embodiment, the wiper blade may be connected to the horizontally extending wiper guide element at an angle in a vertically downward direction from a center portion of the horizontally extending wiper guide element towards an end portion thereof.

Hereby, it can be assured that the water to be wiped from the vehicle windshield is directed towards the vertically extending end sides of the vehicle windshield.

According to an example embodiment, the horizontally extending wiper guide element may comprise a horizontal wiper guide rail and a fluid reservoir in fluid communication with the horizontal wiper guide rail, wherein each spring element is connected to a piston of the horizontal wiper guide rail, the piston being exposed to a fluid pressure from the fluid in the fluid reservoir.

Hereby, the fluid from the fluid reservoir will provide a pressure towards the pistons thereby forcing the wiper blade towards the windshield. Also, a fluid arrangement will enable for a substantially distributed force of the wiper blade towards the windshield.

According to an example embodiment, the fluid reservoir may comprise a cylinder for housing the fluid, and a reservoir piston for forcing the fluid towards the horizontal wiper guide rail.

The cylinder may be arranged as a "dead mass" which, by means of gravitational forces, pushes the fluid towards the guide rail and thus towards the pistons connected to the spring elements.

According to an example embodiment, the fluid reservoir may comprise a diameter larger than a diameter of the horizontal wiper guide rail. Hereby, the fluid pressure will be higher in the horizontal wiper guide rail than in the fluid reservoir which will secure that the wiper blade is exposed to a proper pressure for forcing being forced towards the vehicle windshield.

According to an example embodiment, the spring elements may comprise a metal of magnetic material, the wiper system further comprising a transparent magnetic coating connectable to a surface of the windshield.

With a transparent magnetic coating applied on the vehicle windshield, and the springs on the wiper attached to a magnet, the attractive force between the coating and magnet will ensure constant pressure on the windshield. The transparent magnetic coating is preferably connected to the inner surface of the vehicle windshield. However, it can also be connected to the outer surface as well.

According to a second aspect, there is provided a vehicle comprising a vehicle windshield and a wiper system according to any one of the embodiments described above in relation to the first aspect, wherein the wiper blade is arranged in abutment with the vehicle windshield.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
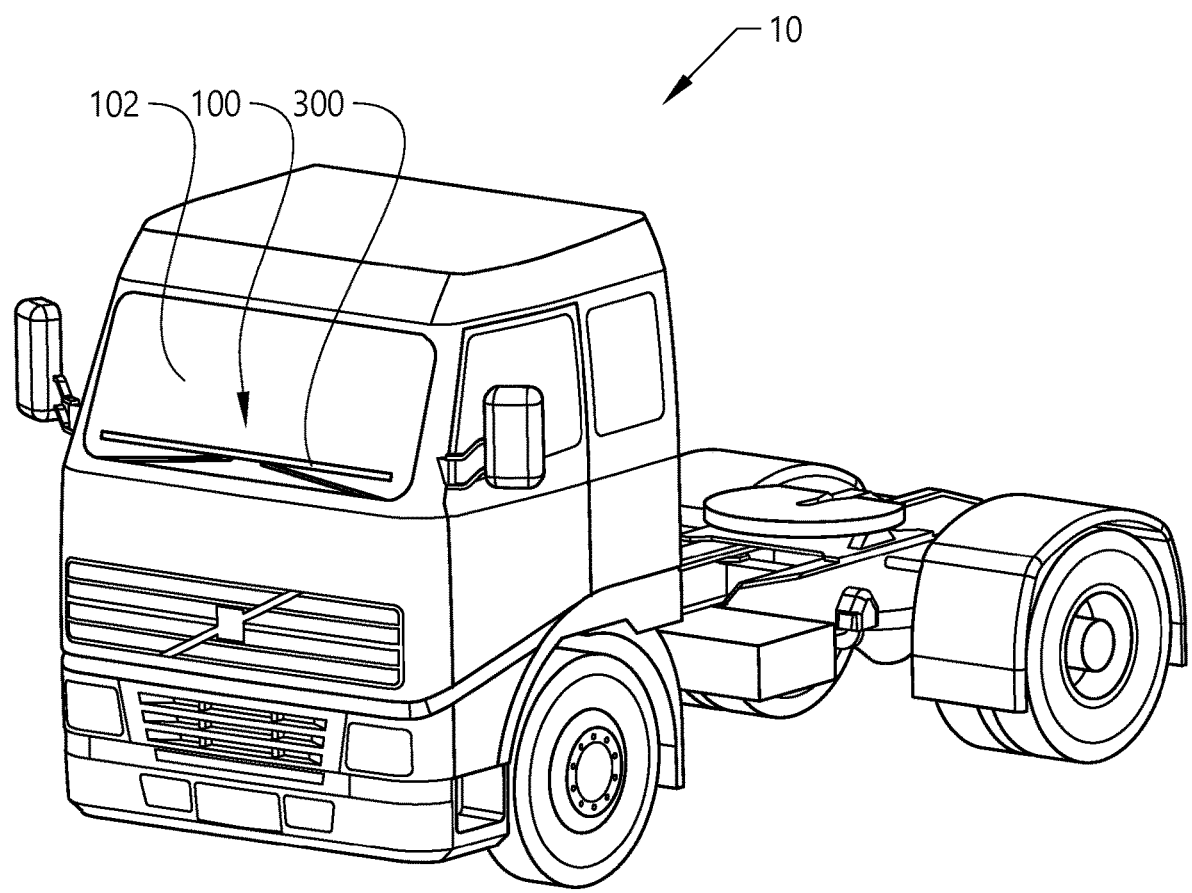
FIG. 1 is a lateral side view illustrating an example embodiment of a vehicle in the form of a truck.

The present disclosure will now be described more fully hereinafter with reference to the accompanying drawings, in which an exemplary embodiment is shown. The disclosure may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a vehicle windshield 102, which is a front vehicle windshield 102. The vehicle 10 further comprises a wiper system 100 for cleaning the vehicle windshield 102 during e.g. rainy weather. As can be seen in FIG. 1, the wiper system 100 comprises horizontal wiper arrangement 300 movable in a substantial pure vertical direction of the vehicle windshield 102. Although the wiper system is described in relation to a front vehicle windshield 102, it can also be arranged in connection to e.g. a rear windshield of a car, etc.

Figure 2:
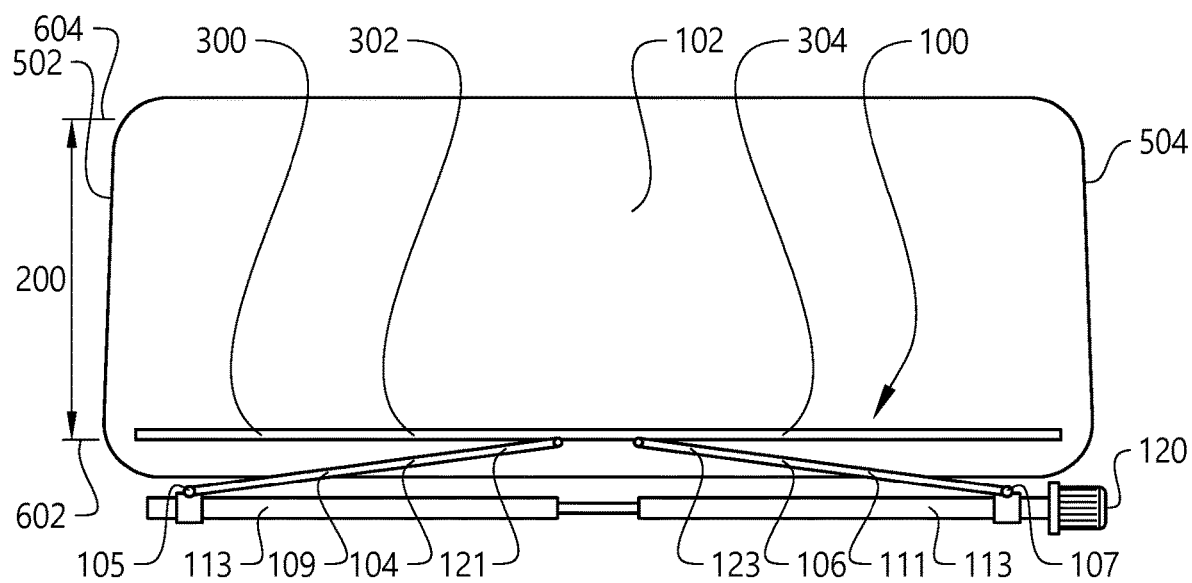
FIG. 2 is a front view of the vehicle windshield and a wiper system according to an example embodiment.
Figure 4:
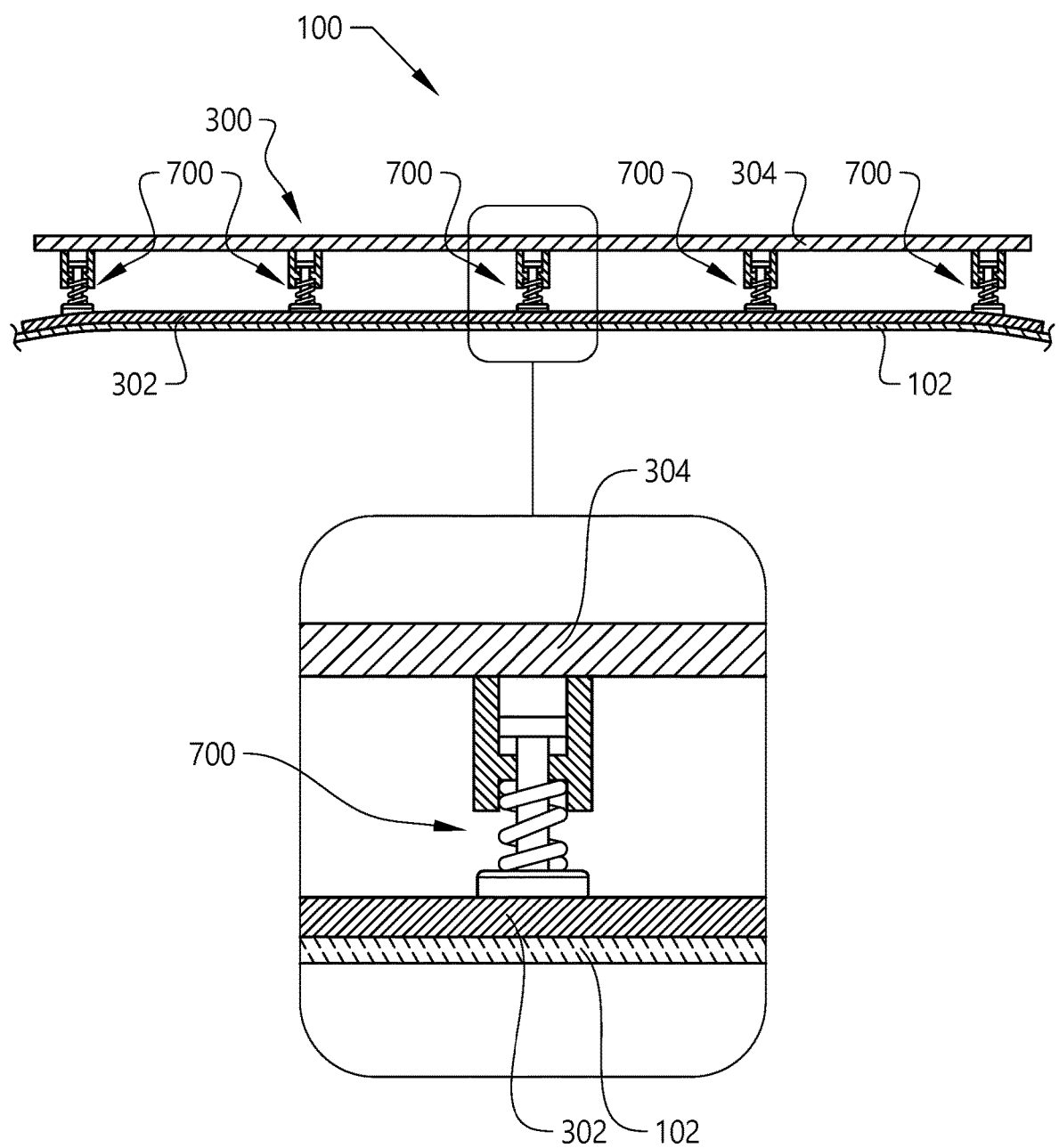
FIG. 4 is a top view of the wiper system according to an example embodiment.

In order to describe the wiper system 100 in further detail, reference is now made to FIG. 2, which is a front view of the vehicle windshield 102 and a wiper system 100 according to an example embodiment. As can be seen in FIG. 2, the wiper system 100 comprises a horizontal wiper arrangement 300. As best illustrated in FIG. 4, the horizontal wiper arrangement 300 comprises a wiper blade 302 which is arranged to wipe the surface of the vehicle windshield 102, and a horizontally extending wiper guide element 304 onto which the wiper blade is connected. The wiper blade 302 is thus arranged to extend between vertical end sides 502, 504 of the vehicle windshield 102.

Furthermore, the wiper system 100 also comprises a first 104 and a second 106 wiper arm. The wiper arms 104, 106 are thus arranged move the horizontal wiper arrangement 300 in the vertical direction 200 between a vertically lower position 602 of the windshield and a vertically higher position 604 thereof. As can be seen, the first 104 and second 106 wiper arms are pivotably connected to the horizontally extending wiper guide element 304. The wiper arms 104, 106 are also pivotably connected to an actuation arrangement by means of a respective pivotable portion 105, 107, where the actuation arrangement is arranged for actuating the movement of the wiper arms 104, 106. According to the example embodiment depicted in FIG. 2, the actuation arrangement comprises an electric motor 120 and a horizontal sliding portion 113 onto which the wiper arms 104, 106 are pivotably connected. Hence, the first 104 and second 106 wiper arms are slidably connected to the horizontal sliding portion 113. Hereby, the electric motor 120 actuates the lower portion of the respective wiper arms 104, 106 to horizontally slide along the horizontal sliding portion 113. The wiper arms 104, 106 will rotate at the respective pivotable portion 105, 107 and force the horizontal wiper arrangement 300 to move in the vertical direction 200.

Other actuation arrangements are also conceivable, such as for example a rack and pinion arrangement, where e.g. the electric motor 120 is connected between two horizontally extending racks. The racks move in the horizontal direction forcing the horizontal wiper arrangement 300 to move in the vertical direction 200. Another solution is to use bevel gears and shafts for achieving the vertical movement of the horizontal wiper arrangement 300. In the latter embodiment, the electric motor 120 can be centrally positioned between two rotating shafts by interconnection using e.g. bevel gears. An opposite end of each rotating shaft can be connected to a respective bevel gear for achieving the rotation of the pivotable portions 105, 107 of the wiper arms.

According to an optional embodiment, each of the first 104 and second 106 wiper arms may comprise a respective retractable portion 109, 111 for extending and retracting the wiper arms 104, 106. The wiper arms 104, 106 may also comprise a respective wiper blade 121, 123 for further improving the wiping characteristics of the wiper system 100.

Figure 3:
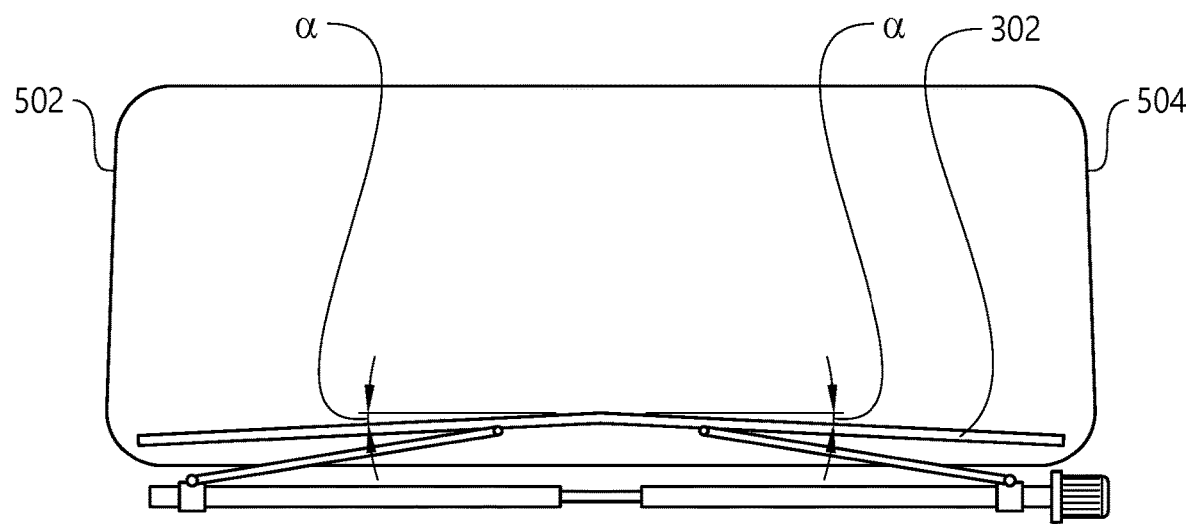
FIG. 3 is a front view illustrating an example embodiment of wiper blade configuration for the wiper system.

In order to describe an example embodiment of the wiper system 100, reference is made to FIG. 3. FIG. 3 illustrates in particular an example embodiment of the wiper blade 302. For simplifying the visual illustration of the wiper blade 302 configuration, the horizontally extending wiper guide is omitted from FIG. 3. In FIG. 3, the wiper blade 302 is connected to the horizontally extending wiper guide element at an angle (α) in a vertically downward direction from a center portion of the horizontally extending wiper guide element towards an end portion thereof. Hereby, water or other substances will be better forced towards the vertical end sides 502, 504 of the vehicle windshield 102.

Reference is now made to FIG. 4 which is a top view of the wiper system 100 according to an example embodiment. As described above, and illustrated in further detail in FIG. 4, the horizontal wiper arrangement 300 comprises the wiper blade 302 and the horizontally extending wiper guide element 304 connected to the wiper blade 302. The following will mainly focus on the interconnection between the horizontally extending wiper guide element 304 and the wiper blade 302.

As can be seen in FIG. 4, the wiper system 100 comprises a plurality of spring elements 700 arranged between the wiper blade 302 and the horizontally extending wiper guide element 304. The plurality of spring elements 700 are spaced apart from each other. According the embodiment in FIG. 4, the plurality of spring elements 700 are uniformly spaced apart from each other. The plurality of spring elements 700 are thus arranged to push the wiper blade 302 towards the surface of the vehicle windshield 102. Hence, the plurality of spring elements 700 are pre-compressed between the wiper blade 302 and the horizontally extending wiper guide element 304. A substantially uniform contact pressure between the wiper blade 302 and the vehicle windshield 102 is achieved over the full length of the wiper blade 302.

Figure 5:
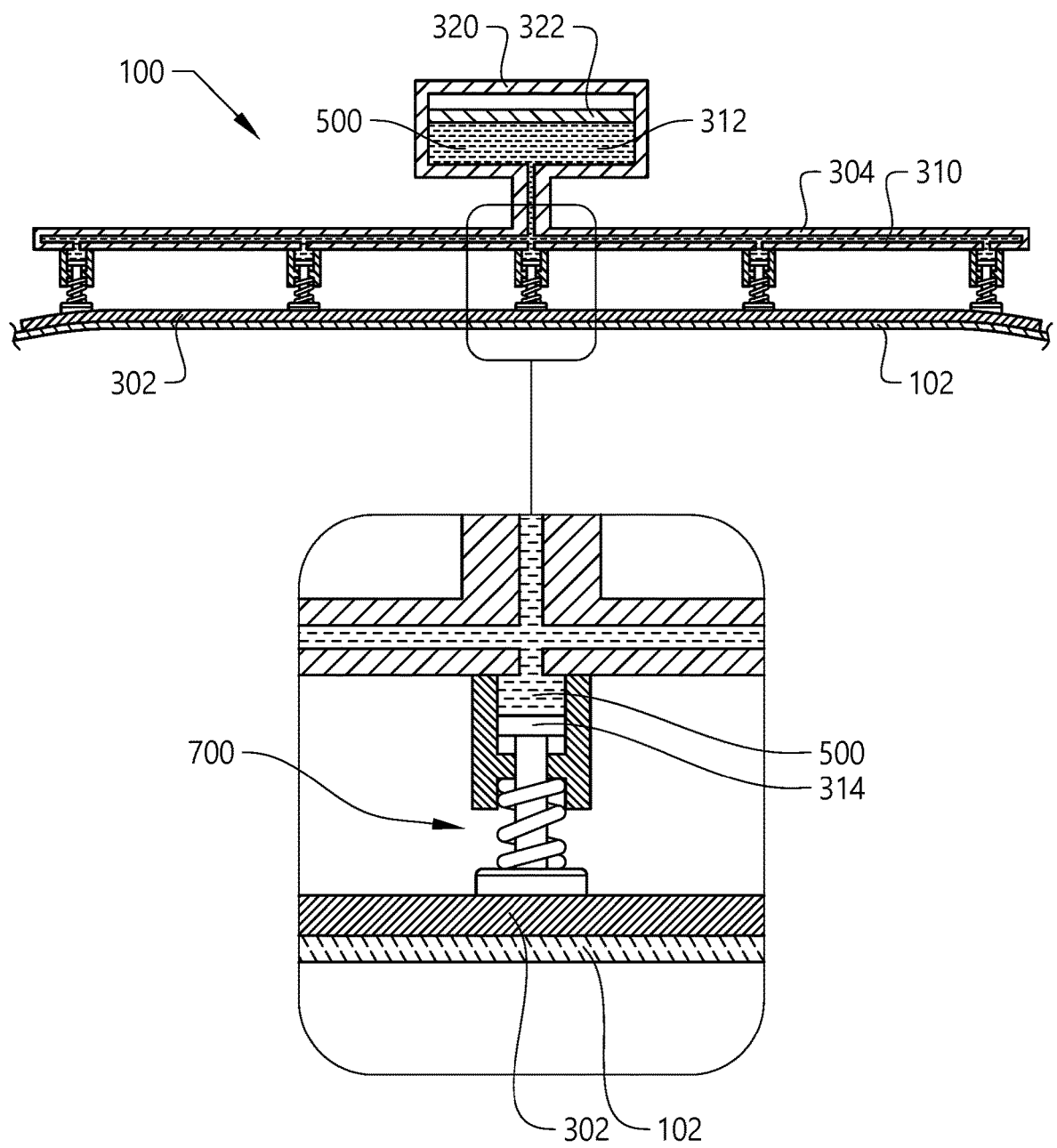
FIG. 5 is a top view of the wiper system according to a further example embodiment.

In order to describe an example embodiment of the wiper system 100, reference is made to FIG. 5. As can be seen, the horizontally extending wiper guide element 304 comprises a horizontal wiper guide rail 310 and a fluid reservoir 312. The fluid reservoir 312 comprises a liquid fluid 500 and the fluid reservoir 312 is in fluid communication with the horizontal wiper guide rail 310 for forcing liquid fluid 500 thereto. As also depicted, each spring 700 is arranged in connection with the liquid fluid 500 in the horizontal wiper guide rail 310 via a respective piston 314. Hence, the liquid fluid 500 from the fluid reservoir 312 is directed to the horizontal wiper guide rail 310 where it exposes the respective piston 314 to a fluid pressure forcing the piston 700 and the wiper blade 302 towards the vehicle windshield 102.

Furthermore, the fluid reservoir 312 comprises a cylinder 320 housing the liquid fluid 500. Also, the fluid reservoir 312 comprises a reservoir piston 322. The reservoir piston 322 is arranged to force the fluid from the fluid reservoir 312 to the horizontal wiper guide rail 310. The reservoir piston 322 is preferably, by its dead weight and the gravitational force, pushing the liquid fluid towards the horizontal wiper guide rail 310. To even further increase the force flow from the fluid reservoir 312 to the horizontal wiper guide rail 310, a diameter of the fluid reservoir 312 is larger than a diameter of the horizontal wiper guide rail.

Accordingly, the fluid reservoir 312 is filled with fluid and the reservoir piston 322 is placed above the fluid. The gravitational force pulls down the reservoir piston 322 at substantially all times, exerting force on the fluid in the channels, i.e. in the horizontal wiper guide rail 310. The force is then transferred to the springs 700 via the pistons 314, which ensures that the wiper blade 302 will always be in constant contact with the vehicle windshield 102. In particular, if e.g. one of the springs does not force the wiper blade 302 sufficiently towards the vehicle windshield 102, the reservoir piston 322 will supply the required fluid into the chamber of that particular spring 700 and force the wiper blade, at this position, towards the vehicle windshield 102. Furthermore, in case the springs 700 are compressed due to e.g. excess pressure, excess fluid can be transferred back to the fluid reservoir 312, or any chamber where the force on the particular piston 314 is relatively low. Hereby, the wiper blade can be ensured to sufficiently touch the vehicle windshield 102.

Preferably, the reservoir piston 322 is designed to float on the liquid fluid 500 in the fluid reservoir 312.

Figure 6:
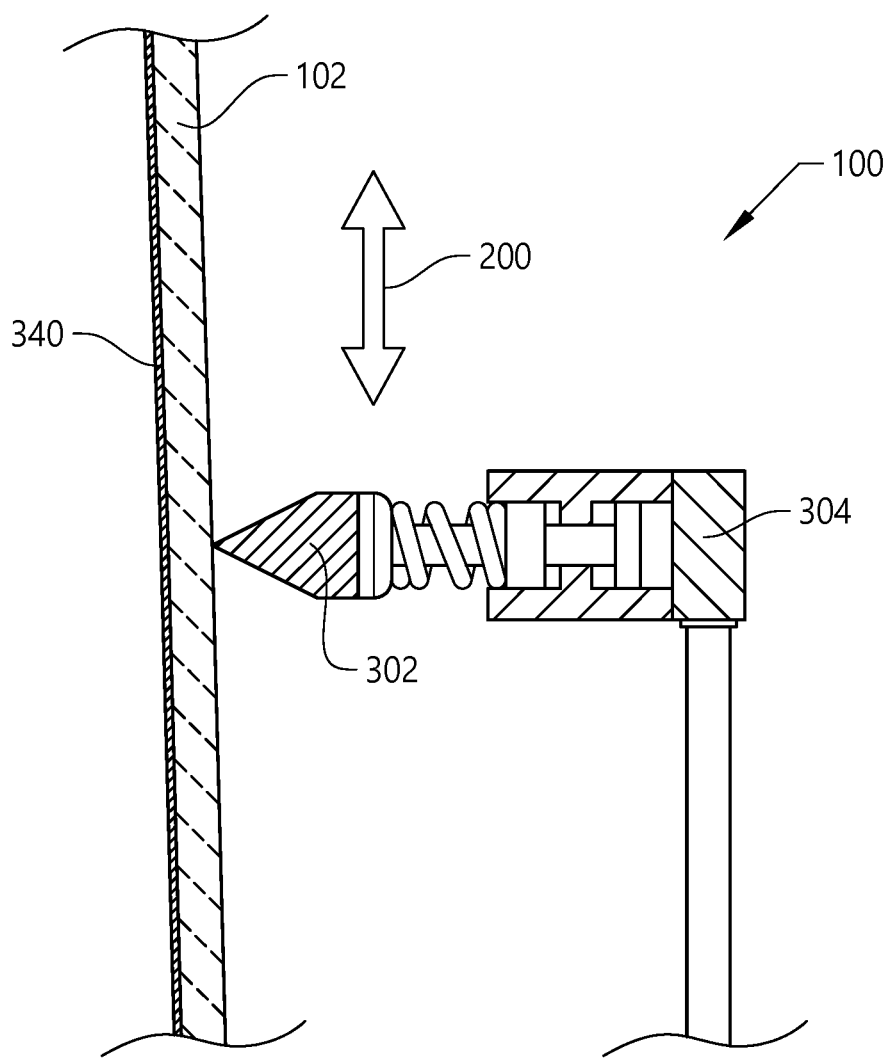
FIG. 6 is a side view of the wiper system according to a still further example embodiment.

Reference is now made to FIG. 6 which is a side view of the wiper system according to a still further example embodiment. The embodiment in FIG. 6 is in many ways similar to the embodiment depicted in FIG. 4 and described above, although the FIG. 6 embodiment can be combined with the embodiment depicted in FIG. 5 as well.

As can be seen in FIG. 6, the wiper system comprises a transparent magnetic coating 340. The magnetic coating 340 is attached to the surface of the vehicle windshield 302, preferably on the inside facing the interior of the vehicle cabin. Moreover, the plurality of spring elements 700 comprises a metal of magnetic material. Hereby, the springs 700 will be forced towards the vehicle windshield as a result of magnetism.

It is to be understood that the present disclosure is not limited to the embodiments described above and illustrated in the drawings; rather, the skilled person will recognize that many changes and modifications may be made within the scope of the appended claims.

The invention claimed is:

1. A wiper system for a vehicle windshield, the wiper system comprising:
   a first wiper arm and a second wiper arm, the first and second wiper arms being movable in at least a vertical direction; and
   a horizontal wiper arrangement comprising:
      a wiper blade configured to wipe a surface of the vehicle windshield;
      a horizontally extending wiper guide element connected to the wiper blade for configuring the wiper blade to extend between vertical end sides of the vehicle windshield, the first and second wiper arms connected to the horizontally extending wiper guide element for vertically moving the horizontal wiper arrangement between a vertically lower position of the vehicle windshield and a vertically higher position of the vehicle windshield; and
      a plurality of spring elements connecting the wiper blade to the horizontally extending wiper guide element, the plurality of spring elements being spaced apart from each other along the length of the horizontally extending wiper guide element, wherein the spring elements are configured to force the wiper blade towards the windshield in a horizontal direction perpendicular to the direction of the horizontally extending wiper guide element;
      wherein the horizontally extending wiper guide element comprises a horizontal wiper guide rail and a fluid reservoir in fluid communication with the horizontal wiper guide rail, wherein each spring element is connected to a piston of the horizontal wiper guide rail, the piston being exposed to a fluid pressure from the fluid in the fluid reservoir.

2. The wiper system of claim 1, wherein the plurality of spring elements are uniformly spaced apart from each other.

3. The wiper system of claim 1, wherein each of the first and second wiper arms is pivotably connected to the horizontally extending wiper guide element for rotation around a geometric rotation axis configured to be substantially perpendicular to a plane defined by the surface of the windshield.

4. The wiper system of claim 1, wherein each of the first and second wiper arms comprises a pivotable portion at an opposite end compared to the connection of the horizontally extending wiper guide element, wherein the first and second wiper arms are rotatably connectable to a portion of the vehicle chassis.

5. The wiper system of claim 1, wherein each of the first and second wiper arms comprises a retractable portion for extending and retracting the first and second wiper arms when vertically moving the horizontal wiper arrangement between the vertically lower and upper positions of the vehicle windshield.

6. The wiper system of claim 1, further comprising a horizontal sliding portion, wherein one of the end portions of each of the first and second wiper arms is slidably connected to the horizontal sliding portion for being horizontally movable when vertically moving the horizontal wiper arrangement between the vertically lower and upper positions of the vehicle windshield.

7. The wiper system of claim 1, further comprising an electric motor connected to each of the first and second wiper arms for controlling the vertical motion of the horizontal wiper arrangement.

8. The wiper system of claim 1, wherein the first and second wiper arms comprises a respective wiper blade configured to slide against the surface of the vehicle windshield when vertically moving the horizontal wiper arrangement between the vertically lower and upper positions of the vehicle windshield.

9. The wiper system of claim 1, wherein the fluid reservoir comprises a cylinder for housing the fluid, and a reservoir piston for forcing the fluid towards the horizontal wiper guide rail.

10. The wiper system of claim 1, wherein the fluid reservoir comprises a diameter larger than a diameter of the horizontal wiper guide rail.

11. The wiper system of claim 1, wherein the spring elements comprises a metal of magnetic material, the wiper system further comprising a transparent magnetic coating connectable to a surface of the windshield.

12. A vehicle comprising:
   a vehicle windshield; and
   a wiper system, comprising:
      a first wiper arm and a second wiper arm, the first and second wiper arms being movable in at least a vertical direction; and
      a horizontal wiper arrangement comprising:
         a wiper blade configured to wipe a surface of the vehicle windshield,
         a horizontally extending wiper guide element connected to the wiper blade for configuring the wiper blade to extend between vertical end sides of the vehicle windshield, the first and second wiper arms connected to the horizontally extending wiper guide element for vertically moving the horizontal wiper arrangement between a vertically lower position of the vehicle windshield and a vertically higher position of the vehicle windshield; and
         a plurality of spring elements connecting the wiper blade to the horizontally extending wiper guide element, the plurality of spring elements being spaced apart from each other along the length of the horizontally extending wiper guide element, wherein the spring elements are configured to force the wiper blade towards the windshield in a horizontal direction perpendicular to the direction of the horizontally extending wiper guide element, wherein the wiper blade is arranged in abutment with the vehicle windshield; and wherein the horizontally extending wiper guide element comprises a horizontal wiper guide rail and a fluid reservoir in fluid communication with the horizontal wiper guide rail, wherein each spring element is connected to a piston of the horizontal wiper guide rail, the piston being exposed to a fluid pressure from the fluid in the fluid reservoir.

* * * * *